Figure 1:
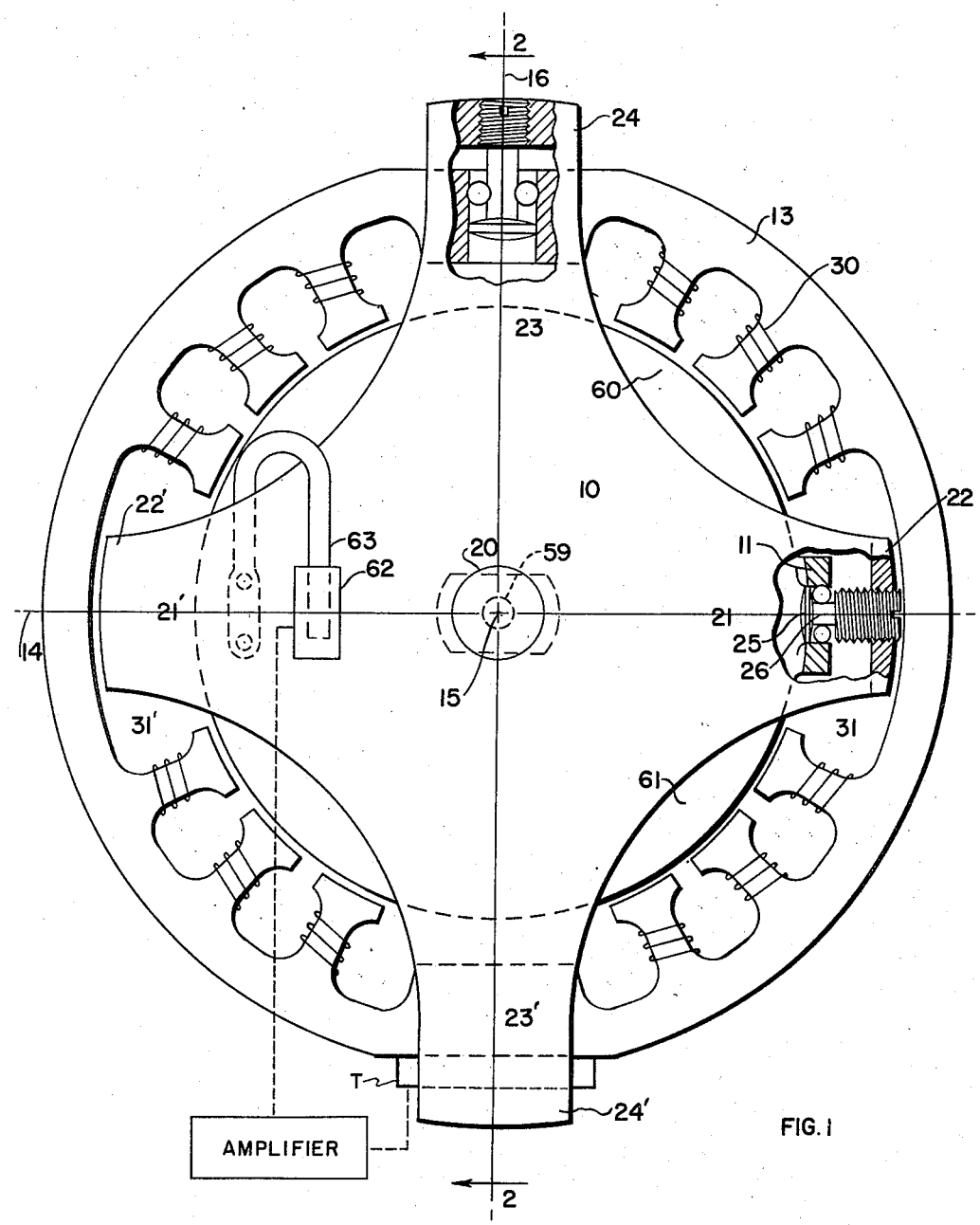

INVENTORS
DONALD L. ATKINSON
LOREN E. CURRISTON

Aug. 11, 1959  D. L. ATKINSON ET AL  2,898,765
GYROSCOPE

Filed July 29, 1957  2 Sheets-Sheet 2

INVENTORS
DONALD L. ATKINSON
LOREN E. CURRISTON
BY

United States Patent Office 2,898,765
Patented Aug. 11, 1959

2,898,765
GYROSCOPE

Donald L. Atkinson, Huntington, and Loren E. Curriston, Syosset, N.Y., assignors to Lear, Incorporated Application July 29, 1957, Serial No. 674,796

13 Claims. (Cl. 74—5)

The invention relates to gyroscopes and is particularly adaptable to floated gyroscopes.

The common structure of present day gyroscopes is a stator with a rotor mounted therewith for driven rotation relative to the stator. The rotor has a fixed axis relative to the stator and the stator is usually pivotally mounted in a gimbal ring or the like. Such structure requires slip rings or the like for conducting current to the stator, or if the rotor is air driven, means for conducting the air to the stator so that movement may be imparted to the rotor. In these structures the pivot frictions were generally high because of the slip ring or other power connections and also because certain parts thereof could not readily be floated in a fluid which would practically eliminate the weight thereof from the bearings. Furthermore, in these constructions, the ratio of the rotary inertia of the rotor to its weight is lower than desired and maximum kinetic design features to maintain axial and radial rigidity of the rotor are not present. These prior designs, because of their problems, and deficiencies also demanded gyros of larger size and weight than desired, thus adding to the space and weight problems in designing airframes or the like.

In view of the foregoing problems and deficiencies encountered in the prior gyros, it is apparent that one of the objects of the present invention is to provide a gyro which is simple in construction, novel, economical to manufacture, compact, small in size, light in weight and which overcomes the deficiencies and problems encountered with the prior gyros.

Another object of the present invention is to provide a gyro wherein the rotor may be precessed by pivotal movement of the stator or other means which rotates the rotor.

A further object of the invention is to provide a gyro element which is fully floated to provide minimum friction on bearings pivotally aligning that element with respect to another part of the gyro.

A further object of the invention is to provide a rotor which has a high rotary inertia in proportion to its weight.

A further object of the invention is to provide a rotor in which maximum kinetic design features maintain axial and radial rigidity of the rotor.

A further object of the invention is to provide structure completely inclosing and supporting a gyro rotor and forces penetrating that structure and acting on the rotor to rotate it and to precess the structure.

A further object of the invention is to provide a sensitive gyro element with no mechanical or electrical or any other physical connections which could disturb its orientation in space other than the magnetic field of the gyro stator which is used to rotate the gyro rotor and also to precess the gyro element in space as required.

A further object of the invention is to provide a gyro frame with a plurality of pivot mounts providing three pivotal axes in the frame so that the pivot axis of one mount is perpendicular to at least two other axes of the other mounts on the frame.

A further object of the invention is to provide a gyroscope in which an inner gimbal is mounted in an outer gimbal for pivotal movement on a first axis and a rotor is mounted in the inner gimbal for rotation about a second axis with the rotor being driven by driving means mounted in the outer gimbal for pivotal movement about a third axis, each axis being perpendicular to the other two axes.

A further object of the invention is to provide for the use of ball bearings or the like for aligning a floated rotor having a hollow shaft in a sealed spherical container.

Figure 2:
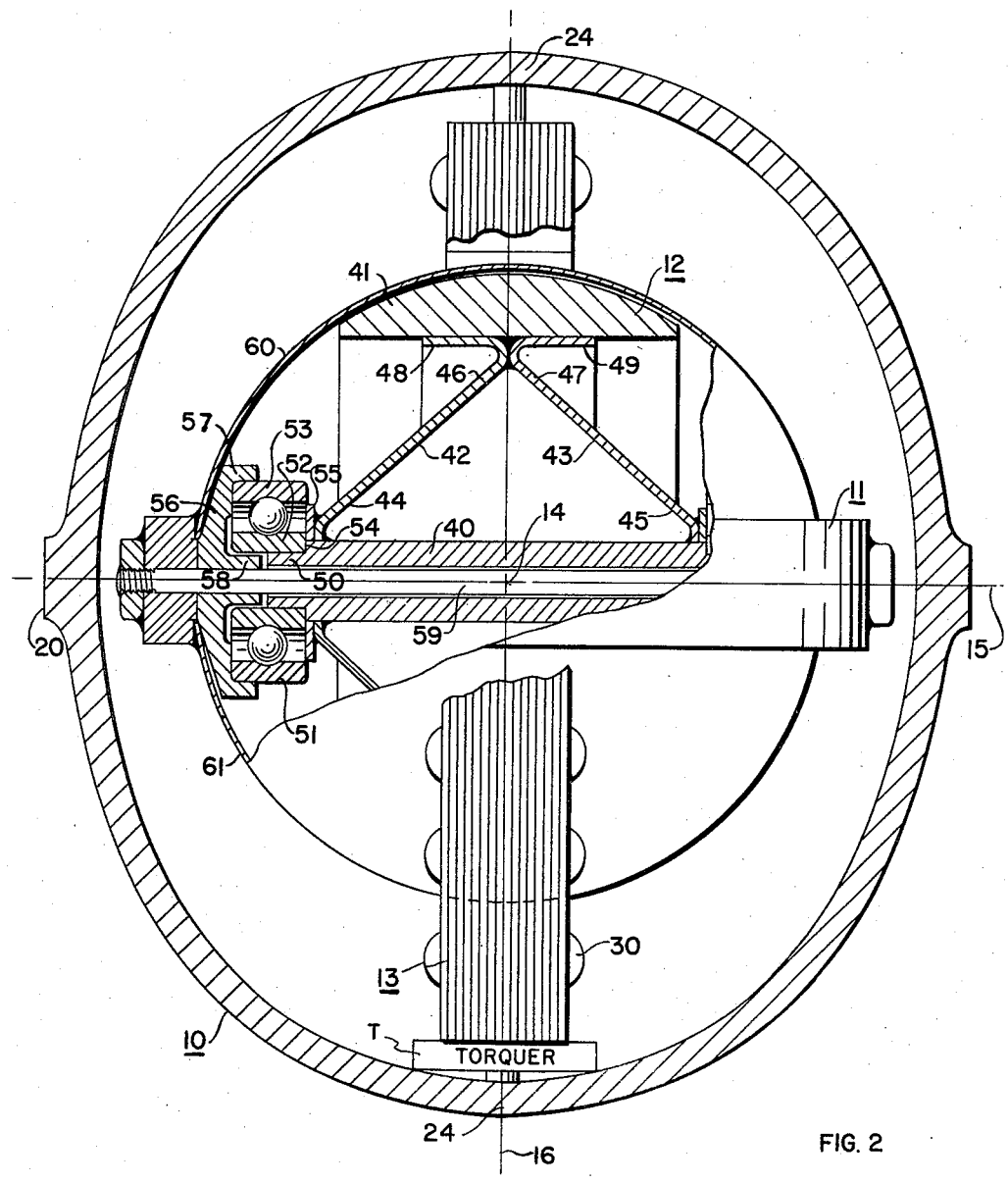

Other objects and a fuller understanding of the invention will become apparent from the following description of structure used in carrying out the invention:

In the present invention, the gyro comprises a plurality of pivot mounts, each having a pivot axis and supporting structure rigidly supporting all of these mounts with the pivot axis of one mount perpendicular to at least two other pivot axes of other mounts. Driving means are mounted in the first of said mounts for pivotal movement about the pivot axis thereof and a gimbal is mounted in the second of said mounts for pivotal movement about the axis thereof. A rotor is mounted in the gimbal in rotationally driven relation with driving means. The rotor is constructed from a solid peripheral ring of magnetically responsive material, a hollow shaft and a pair of modified cone-shaped end bells having their vertexes joined to the shaft and their bases joined to the ring and to each other. Preferably each of these end bells has a cylindrical flange portion integral with the base end thereof and extending towards the vertex end thereof and engaging the ring. A specific example of a preferred embodiment of the invention is illustrated for purposes of clarity and not of limitation in the accompanying drawings in which:

Figure 1 is an elevational plan view of the gyro with certain parts broken away and other parts shown in cross-section, and Figure 2 is a view approximately along the line 2—2 of Figure 1 with certain parts broken away and other parts shown in cross-section.

The illustrated embodiment of the invention has an outer gimbal 10, an inner gimbal 11, a rotor 12 and a stator 13. The inner gimbal 11 is pivotally mounted on the outer gimbal 10 for pivotal movement about a first axis 14. The rotor is mounted in this inner gimbal 11 for rotation about a second axis 15 which is perpendicular to the axis 14. The stator 13 is mounted on the outer gimbal 10 for pivotal movement about a third axis 16 which is perpendicular to the first and second axes 14 and 15.

The outer gimbal 10 is preferably in the form of a hollow cage having a front side and a back side. For purposes of description, the front side will be described, it being understood that the back side is of similar construction. The front side, as illustrated, has a center portion 20 which provides for a mounting of the outer gimbal or frame on suitable supporting structure such as an air frame or the like, not illustrated in the drawings, and on a pivot axis which may or may not be exactly aligned with the axis 15. Extending outwardly from this center portion 20, and diametrically in opposite directions relative to the pivot axis thereof, are support portions 21 and 21' which terminate in the mounts 22 and 22' for the inner gimbal 11. The gimbal mounts 22 and 22' provide the axis 14 about which the inner gimbal may pivot. Also extending outwardly from the center portion 20, and in diametrically opposite directions to the pivot axis thereof, are support portions 23 and 23' which terminate in stator mounts 24 and 24' to provide pivot axis 16.

The inner gimbal 11 and the stator 13 are pivotally supported for pivotal movement about their respective axes 14 and 16 by suitable bearing support means such as are commonly used in the industry. For example, the inner gimbal 11 is provided with axial and radial pivot pin receiving bearing 25 receiving a pivot pin 26 threaded or otherwise fastened in the mount 22. Similar structure may be used for pivotally mounting the stator.

The stator 13 is constructed of a plurality of ring shaped laminations joined together and forming an annulus about the rotor. The stator has the necessary stator windings 30 and is provided with recesses 31 and 31' on diametrically opposite sides thereof and on the inside to accommodate the inner gimbal mounts 22 and 22' of the outer gimbal 10. In this way the stator is positioned on the outside of the mounts 22 and 22' which support the inner gimbal while the mounts 24 and 24' are on the outside of the stator. The recesses 31 and 31' are thus perpendicularly displaced from the pivot axis of the stator.

Rotor

The rotor 12 preferably comprises an inner annular member or hollow shaft 40 and an outer annular member or ring 41 structurally joined together by a pair of end bells 42 and 43. The end bells 42 and 43 are of modified cone-shape and have their vertex ends 44 and 45 secured to the shaft 40 and their base ends 46 and 47 secured to the ring 41 and also preferably to each other. For ease of manufacture as well as to stiffen the joining of the base ends to the ring 41, the base ends are provided with annular peripheral cylindrical flanges 48 and 49 which extend from their respective base end toward the respective vertex and are joined to the ring 41. More specifically, the end bell 42, as illustrated in Figure 2, is easily constructed by spinning a sheet of material into the somewhat conical shape having a vertex end 44 and the base end 46 with the flange 48 folded somewhat back upon itself and extending axially toward the vertex end 44. The vertex ends 44 and 45 may be soldered, brazed or otherwise secured to the shaft and the base ends 46 and 47 may be soldered, brazed or otherwise rigidly secured to the ring 41, preferably intermediate the axial length of the ring 41.

As illustrated further in Figure 2, the shaft 40 has an axial length greater than the axial length of the ring 41 and has bearing support portion on each end thereof. Since the bearing supports on each end are substantially identical, the bearing on only one end will be described. The shaft 40 terminates in the bearing end portion 50 of reduced diameter and adapted to fit into a ball bearing 51 having an inner race 52 and an outer race 53. The inner race 52 is fitted on the bearing end portion 50 and extends outwardly therebeyond and abuts a square shoulder or face 54 which is perpendicular to the shaft 40 and provided by a washer 55 brazed or otherwise secured to the shaft and the vertex end 44. This washer 55 extends outwardly from the shaft substantially to the inner race 53 to prevent possibilities of dust or dirt from entering the bearing during manufacture and assembly.

The outer race 53 is supported in the inner gimbal 11 by a supporting member 56 which is somewhat cup-shaped. This supporting member 56 has a peripheral flange 57 overlapping and engaging the outer race 53 and has a hub 58 freely entering the inner race 52.

The bearings, the shaft and the supporting members are held in proper alignment by extending a tie rod 59 between the hubs of the supporting members and through the hollow shaft. In this instance the tie rod 59 extends through the supporting members and the inner gimbal 11 and has nuts threaded on each end thereof. The tie rod 59 exerts axial force on the bearings, such as bearing 51, to pre-load the bearings. Bearing outer race alignment is established by bearing cup 56 which is a precise fit on tierod 59 and which has a spherical surface in contact with inner gimbal 11.

Substantially all weight of the rotor and inner gimbal 11 is eliminated from the pivot bearings 25 by inclosing the rotor with shells 60 and 61 which are fastened to the inner gimbal 11 by a sealed joint. These shells 60 and 61 are preferably hemispherical in shape with one shell on either side of the gimbal. It has been found preferable to have the outer surface of the ring 41 of corresponding shape to the shell so that the surface of the ring at all points is as close as possible to the shell without touching it.

The shells 60 and 61 and the inner gimbal 11 completely inclose the rotor and form a capsule which is completely sealed so that no foreign matter can get into the rotor or inside the shells. The capsule may be void of any air, gas or other mass, or it may contain gas or matter which is lighter than the fluid in which the gyro may be submerged. The rotor will rotate when the stator windings are energized since the ring 41 is of magnetically responsive material and in magnetic coupling with the stator 13.

It is particularly noted that this rotor design provides a maximum rotational inertia compared to its weight since the mass is almost entirely in the ring 41. The rotor also has good isoelastic properties.

This structure of the rotor permits construction which is very small, light in weight and excellent in kinetic design. Another advantage in this structure is the fact that the hollow shaft 40 is axially longer than the ring 41 thus providing stability to the design by having maximum spread or distance between the bearings supporting the shaft while remaining within the confines of the spherical structure of the shells and inner gimbal.

In a completed assembly, the entire gyro including outer gimbal 10, may be submerged in suitable fluid if desired. The inner gimbal 11 and the stator 13 are pivotally mounted on the outer gimbal 10 and the rotor 12 is rotatably mounted in the inner gimbal 11 and in magnetic coupling with the stator 13. Pivotal movement of the stator 13, relative to the outer gimbal 10 by a torquer or other suitable means commonly used in gyros, will magnetically urge the rotor to follow the stator and thus precess the rotor. In other words, pivotal movement of the stator 13 moves the axis of the magnetic flux field relative to the rotor spin axis to precess the rotor about the first axis 14 which is the pivot axis of mounting of the inner gimbal on the outer gimbal.

As illustrated in Figure 1, pivotal movement of the stator 13 about axis 16 and relative to outer gimbal 10 is obtained by means of a torquer T. This torquer T may be of any suitable design commonly used for the purpose. The torquer is energized by an amplifier which receives signals from a suitable pickoff device such as, for example, a photoelectric pickoff illustrated in co-pending application, Serial No. 656,859, entitled, "Pickoff Responsive to Displacement Between Relatively Movable Members." The photoelectric pickoff has cells 62 connected to the amplifier and mounted on the outer gimbal 10 and a shutter 63 mounted on the inner gimbal 11. The cells 62 are connected to the amplifier so that movement of the shutter 63 relative to the cells causes a torquing or pivotal movement of the stator 13 about pivot axis 16. The pickoff measures motion of gimbal 11 about axis 14 and relative to the outer gimbal or frame 10 in such manner that if the axis 15 tends to be shifted from a perpendicular position relative to axes 14 and 16, the torquer T will be energized to pivot the stator 13. Pivoting of stator 13 causes the rotor to magnetically follow it and thus precess the rotor to pull the axis 15, which is the rotor axis, back into a position perpendicular to the axes 14 and 16, or vice versa.

It is apparent from the foregoing construction of the specific embodiment of the invention that the objects thereof have been met and that the problems and deficiencies in prior constructions have been overcome. It is understood that various modifications in the details and design or arrangement of parts may be had without departing from the spirit and scope of the invention as hereinafter claimed.

We claim:

1. A gyro comprising a plurality of pivot mounts each having a pivot axis, supporting structure rigidly supporting all of said mounts with the pivot axis of one mount perpendicular to at least two other pivot axes of other mounts, driving means mounted in a first of said mounts for pivotal movement about the pivot axis thereof, a gimbal mounted in a second of said mounts for pivotal movement about the axis thereof, and a rotor mounted in said gimbal in rotationally driven relation with said driving means, said rotor comprising a solid peripheral ring of magnetically responsive material, a hollow shaft, and a pair of modified cone-shaped end bells having their vertexes joined to said shaft and their bases joined to the inner central surface of said ring and to each other.

2. A gyro comprising a plurality of pivot mounts each having a pivot axis, supporting structure rigidly supporting all of said mounts with the pivot axis of one mount perpendicular to at least two other pivot axes of other mounts, driving means mounted in a first of said mounts for pivotal movement about the pivot axis thereof, a gimbal mounted in a second of said mounts for pivotal movement about the axis thereof, and a rotor mounted in said gimbal in rotationally driven relation with said driving means, said rotor comprising a solid peripheral ring of magnetically responsive material, a hollow shaft, and a pair of modified cone-shaped end bells having their vertexes joined to said shaft and their bases joined to said ring, and to each other, each of said end bells having a cylindrical flange portion integral with the base end thereof and extending toward the vertex end thereof and engaging said rings.

3. A gyro comprising a plurality of pairs of pivot mounts, each pair having a pivot axis, supporting structure rigidly supporting all of said mounts with the pivot axis of any one pair of mounts perpendicular to at least two other pivot axes of other pairs of mounts, said supporting structure being in the form of a hollow cage, an electrically energizable stator mounted in a first of said mounts for pivotal movement about the pivot axis thereof, a gimbal mounted in a second of said pair of mounts for pivotal movement about the axis thereof, and a rotor mounted in said gimbal in magnetic coupling relation with said stator.

4. A gyro comprising a plurality of pairs of pivot mounts, each pair having a pivot axis, supporting structure rigidly supporting all of said mounts with the pivot axis of one pair of mounts perpendicular to at least two other pivot axes of other pairs of mounts, said supporting structure being in the form of a hollow cage, an electrically energizable stator mounted in a first of said mounts for pivotal movement about the pivot axis thereof, a gimbal mounted in a second of said pair of mounts for pivotal movement about the axis thereof, and hemispherical shells fitted to said gimbal and entirely inclosing said rotor, said rotor comprising a solid peripheral ring of magnetically responsive material, a hollow shaft, and a pair of modified cone-shaped end bells having their vertexes joined to the respective ends of said shaft and their bases joined to said ring and to each other, each of said end bells having a cylindrical flange portion integral with the base end thereof and extending toward the vertex end thereof and engaging said ring.

5. A gyroscope comprising an outer gimbal, an inner gimbal mounted therein for pivotal movement about a first axis, a rotor mounted in said inner gimbal for rotation about an axis perpendicular to said first axis, and driving means drivingly associated with said rotor and mounted in said outer gimbal for pivotal movement about a third axis perpendicular to said first and second axes.

6. A gyroscope comprising an outer gimbal, an inner gimbal mounted therein for pivotal movement about a first axis, a rotor mounted in said inner gimbal for rotation about an axis perpendicular to said first axis, driving means drivingly associated with said rotor and mounted in said outer gimbal for pivotal movement about a third axis perpendicular to said first and second axes, and means responsive to pivotal movement of said inner gimbal to pivotally move said driving means.

7. A gyroscope comprising an outer gimbal, an inner gimbal mounted therein for pivotal movement about a first axis, a rotor mounted in said inner gimbal for rotation about an axis perpendicular to said first axis, and an electrically energizable stator magnetically coupled with said rotor and mounted in said outer gimbal for pivotal movement about a third axis perpendicular to said first and second axes.

8. A gyro rotor comprising an inner and an outer annular member, and a pair of end bells of modified cone-shape having their vertexes joined to said inner member and their bases joined together and to said outer member, said bases each having a peripheral cylindrical flange extending therefrom towards the respective vertex and joined to said outer member.

9. A gyro rotor comprising an inner and an outer annular member, a pair of end bells of modified cone-shape having their vertexes joined to said inner member and their bases joined together and to said outer member, said outer member being constructed of magnetically responsive material.

10. In a gyro, an inner member, an outer annular member of magnetically responsive material, a pair of end bells of modified cone-shape having vertex angles of at least approximately 90° and joined to said inner member and their bases joined together and to said outer member, said outer member having an axial length shorter than said inner member, said bases each having a peripheral cylindrical flange extending therefrom toward the respective vertex and joined to said outer member, a gimbal ring, means on each end of said inner member aligning said rotor in said gimbal, and shells sealingly fitted on said gimbal and inclosing said rotor.

11. In a gyro, an inner and an outer annular member, a pair of end bells of modified cone-shape having their vertexes joined to said inner member and their bases joined to said outer member and to each other, a gimbal ring, shells sealingly fitted on said gimbal and inclosing said rotor, a pair of ball bearings, one for each end of said inner member, and a pair of supports, one for each bearing, each said bearing having an inner race and an outer race, each inner race being fitted on its respective end of said inner member and extending outwardly therebeyond, each said support being joined to said gimbal and supporting its respective outer race with a portion thereof extending freely into its respective inner race, and a tierod extending between said supports and through said shaft to exert axial pressure on said ball bearings.

12. A gyroscope comprising an outer gimbal, an inner gimbal mounted therein for pivotal movement about a first axis, a rotor mounted in said inner gimbal for rotation about an axis perpendicular to said first axis, and driving means drivingly associated with said rotor and mounted in said outer gimbal for pivotal movement about a third axis perpendicular to said first and second axes, a torquer to pivot said driving means, and means responsive to pivotal movement of said inner gimbal relative to said outer gimbal to control said torquer.

13. A gyroscope comprising an outer gimbal, an inner gimbal mounted therein for pivotal movement about a first axis, a rotor mounted in said inner gimbal for rotation about an axis perpendicular to said first axis, and an electrically energizable stator magnetically coupled with said rotor and mounted in said outer gimbal for pivotal movement about a third axis perpendicular to said first and second axes, electrically energizable means to pivotally move said stator, and a pickoff responsive to pivotal movement of said inner gimbal to control the energization of said electrically energizable means.

References Cited in the file of this patent

UNITED STATES PATENTS

| | | |
|---|---|---|
| 1,757,096 | Sperry | May 6, 1930 |
| 2,091,888 | Schmidt | Aug. 31, 1937 |
| 2,299,231 | Heintz et al. | Oct. 20, 1942 |
| 2,301,700 | Heintz | Nov. 10, 1942 |
| 2,410,002 | Bach | Oct. 29, 1946 |
| 2,608,867 | Kellog et al. | Sept. 2, 1952 |
| 2,711,356 | Ensinger | June 21, 1955 |
| 2,720,602 | Dolude | Oct. 11, 1955 |